United States Patent [19]
Dianora

[11] 3,733,542
[45] May 15, 1973

[54] FREQUENCY STEP GENERATOR

[75] Inventor: Mario D. Dianora, Deptford, N.J.

[73] Assignee: The United States of America as represented by the Secretary of the Navy, Washington, D.C.

[22] Filed: June 26, 1972

[21] Appl. No.: 266,029

[52] U.S. Cl. .......................................321/60, 331/49
[51] Int. Cl. ...................................H02m 5/00, H03b
[58] Field of Search ...........................331/49; 321/60

[56] References Cited

UNITED STATES PATENTS

| | | | |
|---|---|---|---|
| 3,289,097 | 11/1966 | Martin | 331/49 |
| 2,731,565 | 1/1956 | Keizer et al. | 331/49 |
| 3,329,905 | 7/1967 | Niertit et al. | 331/49 |
| 3,431,510 | 3/1969 | Reis et al. | 331/49 |

*Primary Examiner*—William M. Shoop, Jr.
*Attorney*—R. S. Sciascia et al.

[57] ABSTRACT

The invention disclosed herein provides a frequency generator having a pair of oscillators producing two frequencies coupled thru individual gate circuits to provide an output of one or another of said frequencies. There is provided a gating circuit and an adder which combines the output frequencies which actuate a Schmidt trigger which in turn actuates a bistable multivibrator which controls the individual gates.

5 Claims, 2 Drawing Figures

FREQUENCY STEP GENERATOR

In the course of running various tests utilizing machines that have response time, it is often desired to check response time of frequency deviation meters. At the present time, it does not appear there are practical means for providing the inexpensive and instantaneous frequence generators which include the improvement of the construction of this invention.

It is therefore an object of this invention to provide a new and improved frequency step generator.

It is yet a further object of this invention to provide an improved frequency step generator which instantaneously shifts from one frequency to another frequency with no discontinuance in the signal.

It is yet a further object of this invention, to provide an improved frequency step generator having individual frequencies which are independently selected and where a change in frequency does not produce any change in amplitude of the test frequency.

And yet a further object of this invention is to provide an improved frequency step generator; comprising; a first oscillator having a first output at a first frequency; a second oscillator having a second output at a second frequency; a first gage circuit coupled to receive the first frequency; a second gage circuit coupled to receive the second frequency, the first gage circuit and the second gage circuit having a common output circuit; an adder circuit coupled to receive the first and second frequencies and having a third output that is the sum of the first and second frequencies; a Schmidt trigger circuit coupled to receive the sum of the first and second frequencies and having a fourth output; a monostable multivibrator coupled to receive said fourth output and having a fifth output; a bistable multivibrator circuit coupled to be actuated by the fifth output; and sixth and seventh output circuits coupled from the bistable multivibrator circuit to the first and second gate circuits for actuating the gates to allow only one of the first or second frequencies to be transmitted thru the common output circuit.

Other objects, advantages and novel features of the invention will become apparent from the following detailed description of the invention when considered in conjunction with the accompanying drawings wherein.

Figure 1:
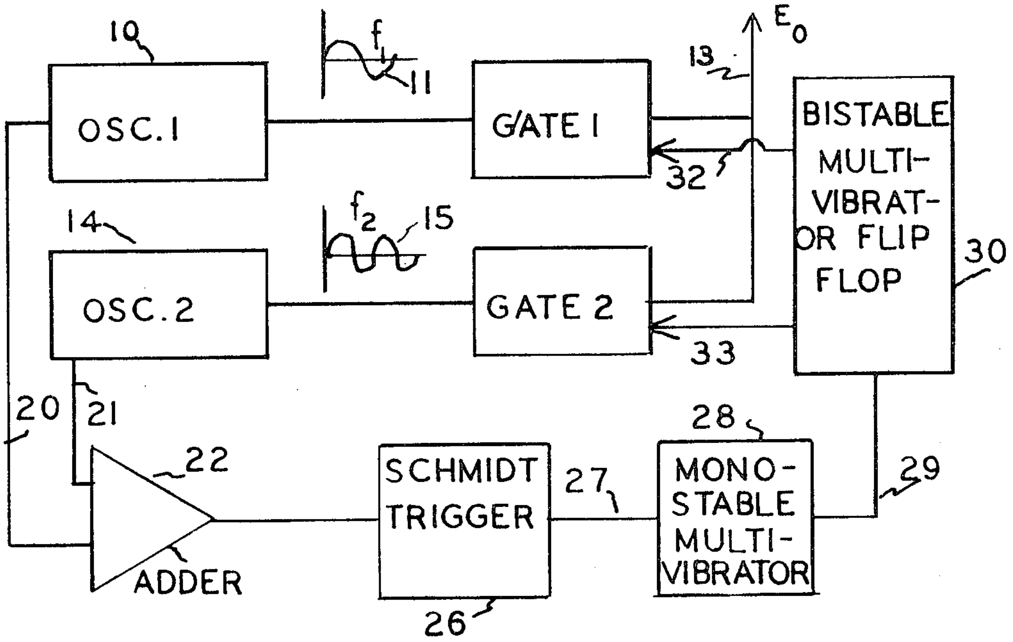
FIG. 1 is a block diagram showing one embodiment of the invention.

In FIG. 1, a first oscillator 10 is shown having a first output signal $F_1$ of a sinusoidal form. The output of oscillator 10 is shown coupled to a gage 12 which in turn has an output designated as line 13 and has an output signal $E_0$. A second oscillator 14 has a sinusoidal form frequency $F_2$ designated as 15. Oscillator 14 is coupled thru a second gage 16 to the common line designated as 13.

The output of oscillators 10 and 14 are also shown connected thru lines 20, 21 to an adder circuit 22, the two signals are added together and coupled to an output designated as line 23. A Schmidt trigger 26 receives the summed frequencies from line 23 and actuates under certain conditions thru it's output 27 a monostable multivibrator 28.

The output of monostable multivibrator 28 is coupled thru line 29 to a bistable multivibrator flip flop circuit 30. There are two outputs 32, 33 of the bistable multivibrator 30 coupled to gate 12 and gate 16.

Oscillators 10 and 14 are free running. Gates 12 and 16 are oppositely biased by the multivibrator so that when gate 12 is open, gage 16 is closed. At time zero, gate 12 opens so that the oscillator 10 signal $F_1$ (11) is fed thru to the output 13 as $E_0$. Gate 16 is closed preventing oscillator 14 from feeding it's output $F_2$ (15) to the output circuit 13.

Output from oscillators 10 and 14 are rectified and fed into the adder circuit 22. Most of the time oscillator 10, or oscillator 14, are not at a positive maximum. However, at some point in time, oscillators 10 and 14 reach a peak at the same time. When this happens, adder circuit 22 has sufficient voltage applied to cause the Schmidt trigger 26 to react. At any other point in time, the sum of the signals will not be large enough to cause the Schmidt trigger to change state. When the Schmidt trigger pulse occurs, it causes monostable multivibrator 28 to change state for a pre-set length of time, (0.5 sec). The change of state of multivibrator 28 causes the gates 12 and 16 to shift state so that gate 12 closes while gate 16 opens.

The result is a step change in the output frequency $E_0$ on line 13.

Initially, oscillators 10 and 14 are set at a desired lower and upper frequencies 11 and 15, and are equal amplitudes. This frequency is adjusted so that in desired tests, frequencies may be generated by the step generator.

Figure 2:
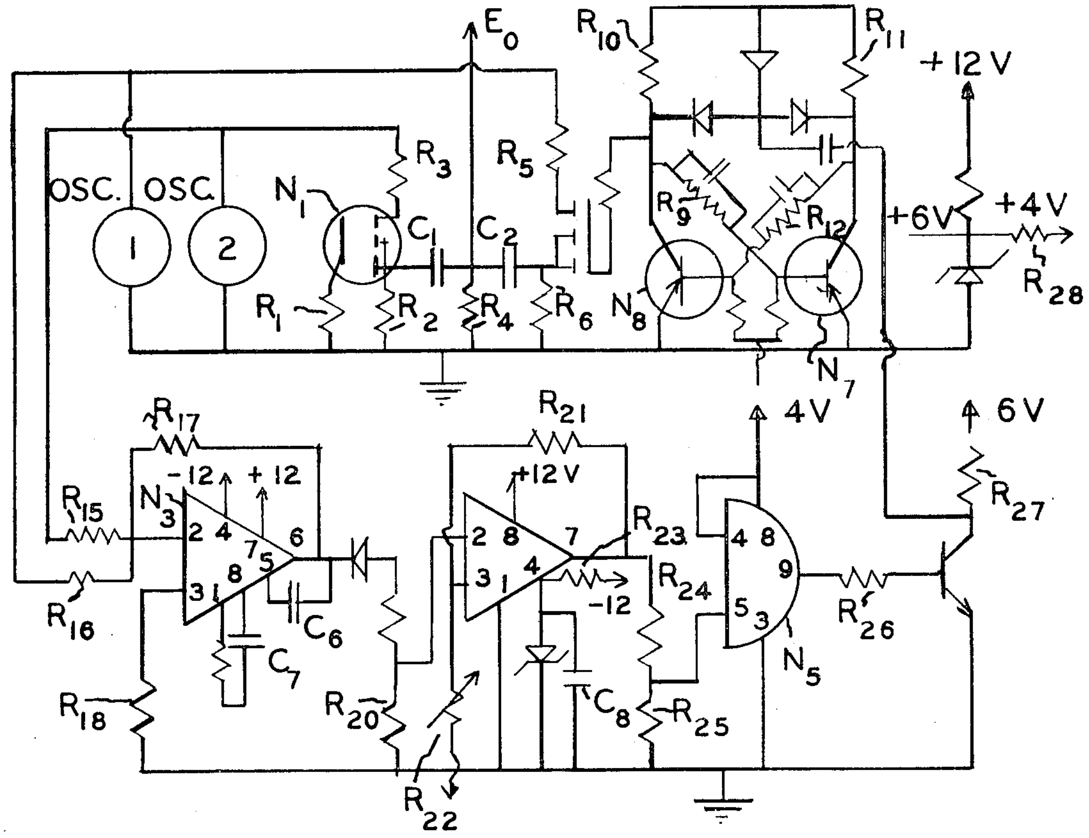
FIG. 2 is a detailed schematic of the embodiment in FIG. 1.

FIG. 2 is a circuit diagram of the invention wherein t he following list of components with values was found successful.

| | |
|---|---|
| $R_1$ | 1 Megohm |
| $R_2$ | 390 ohms |
| $R_3$ | 1500 ohms |
| $R_4$ | 10,000 ohms |
| $R_5$ | 1500 ohms |
| $R_6$ | 390 ohms |
| $R_7$ | 1 Megohm |
| $R_8$ | 1 Megohm |
| $R_9$ | 15000 ohms |
| $R_{10}$ | 2000 ohms |
| $R_{11}$ | 2000 ohms |
| $R_{12}$ | 15,000 ohms |
| $R_{13}$ | ohms |
| $R_{15}$ | 1500 ohms |
| $R_{16}$ | 1500 ohms |
| $R_{17}$ | 15000 ohms |
| $R_{18}$ | 1500 ohms |
| $R_{19}$ | 4700 ohms |
| $R_{20}$ | 1000 ohms |
| $R_{21}$ | 1 megohm |
| $R_{22}$ | 4000 ohms (variable) |
| $R_{23}$ | 560 ohms |
| $R_{24}$ | 4000 ohms |
| $R_{25}$ | 2000 ohms |
| $R_{26}$ | 15000 ohms |
| $R_{27}$ | 3000 ohms |
| $R_{28}$ | 600 ohms |
| $R_{29}$ | 100,000 ohms |
| $C_1$ | 0.1 microfard |
| $C_2$ | 0.1 microfard |
| $C_3$ | 0.001 microfard |
| $C_4$ | 0.001 microfard |
| $C_5$ | 0.005 microfard |
| $C_6$ | 120 picofard |
| $C_7$ | 800 picofard |
| $C_8$ | 0.015 microfard |
| $N_1$ | 3N128 |
| $N_2$ | 3N128 |
| $N_3$ | UA709 |
| $N_4$ | UA702 |
| $N_5$ | SN7380 |
| $N_7$ | 2N1309 |
| $N_8$ | 2N1309 |
| $N_9$ | 2N338 |

Obviously many modifications and variations of the present invention are possible in the light of the above teachings. It is therefore to be understood that within the scope of the appended claims the invention may be practiced otherwise t an as specifically described.

I claim

1. An improved frequency step generator;

a. a first oscillator having a first output at a first frequency;

b. a second oscillator having a second output at a second frequency;

c. a first gate circuit coupled to receive said first frequency;

d. a second gate circuit coupled to receive said second frequency, said first gate circuit and said second gate circuit having a common output circuit.

e. an adder circuit coupled to receive said first and second frequencies and having a third output that is the sum of said first and second frequencies;

f. a Schmidt trigger circuit coupled to receive said sum of said first and second frequencies and having a fourth output;

g. a monostable multivibrator coupled to receive said fourth output and having a fifth output;

h. a bistable multivibrator circuit coupled to be actuated by said fifth output; and i. Sixth and seventh output circuits coupled from said bistable multivibrator circuits to said first and second gate circuits for actuating said gates to allow only one of said first or second frequencies to be transmitted thru said common output circuit.

2. The improved generator of claim 1 wherein said first and second frequency signals are rectified in said adder circuit and their voltages added.

3. The improved generator of claim 2 wherein said Schmidt trigger circuit is adjusted to be actuated only when said rectified voltages are added and produces the maximum sum voltage.

4. The improved generator of claim 3 wherein the first and second oscillator output frequencies are variable.

5. The improved generator of claim 4 wherein the duty cycle of the monostable multivibrator has an adjustable time period.

* * * * *